Nov. 10, 1925.
1,561,417
J. DROLL
DEFLECTOR FOR AUTOMOBILE HEADLIGHTS
Filed Sept. 27, 1922
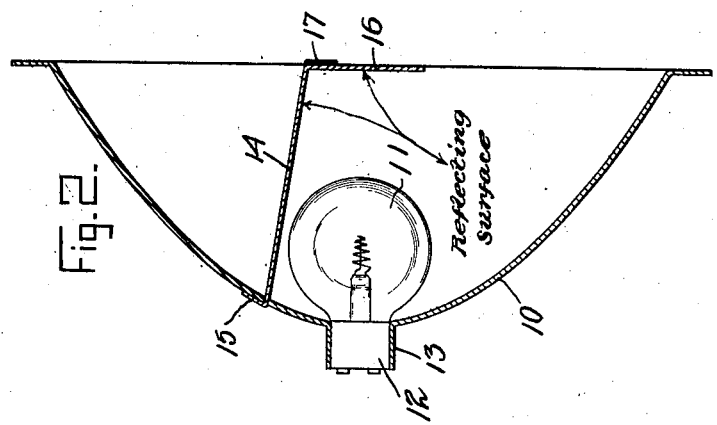
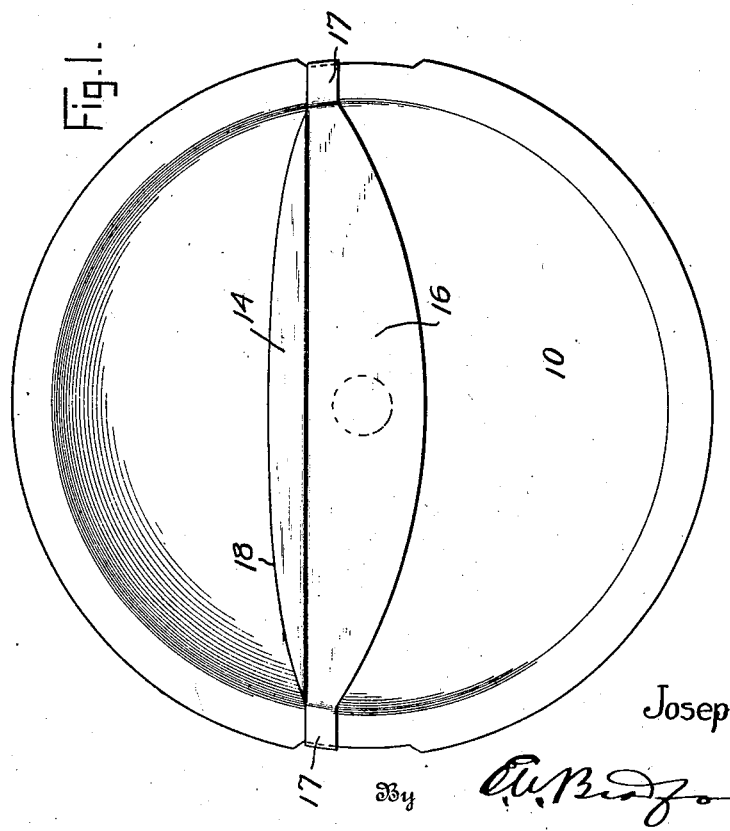
Inventor
Joseph Droll
By
Attorney Patented Nov. 10, 1925.

1,561,417

UNITED STATES PATENT OFFICE.

JOSEPH DROLL, OF FOSTORIA, OHIO.

DEFLECTOR FOR AUTOMOBILE HEADLIGHTS.

Application filed September 27, 1922. Serial No. 590,940.

*To all whom it may concern:*

Be it known that I, JOSEPH DROLL, a citizen of the United States, residing at Fostoria, in the county of Seneca and State of Ohio, have invented certain new and useful Improvements in Deflectors for Automobile Headlights, of which the following is a specification.

My said invention relates to a deflector for automobile headlights and it is an object of the same to provide a deflector which shall do away with any need for dimmers of ordinary type in which either the supply of current to the lamps is changed to make the light bright or dim or else two separate lamps are used, one of which is a small dim lamp.

A further object of the invention is to provide a deflector which can be applied to any automobile headlight and which shall be simple and cheap in construction and application.

Referring to the accompanying drawings, which are made a part hereof and on which similar reference characters indicate similar parts, Figure 1 is a front view of my improved deflector in position on a headlight, and Figure 2 a central vertical section therethrough.

In the drawings reference character 10 indicates a shell of any ordinary or conventional type which is polished or otherwise prepared on the inner side to enable it to act as a reflector. A lamp 11 is held in place in the shell by a plug 12 in a cylindrical extension 13 of the shell, the lamp being supported at the focus of the reflector or otherwise according to whether the reflector is of parabolic, spherical or other conformation. The deflector, which is the particular subject-matter of my invention, comprises a shelf 14 extending across the reflector just above the lamp and secured at its rear end by means of lug 15 protruding through a hollow in the reflector and bent over to retain it in place. At its upper front end the shelving has a depending half-moon-shaped part 16 forming an apron which extends downward farthest at the middle and curves upward toward the sides where the deflector is provided with a pair of lateral extensions 17 which are bent around the edge of the shell to assist in holding the deflector in place. The under surface of the shelf 14 and the rear surface of the apron 16 are preferably reflecting surfaces. The edge 18 of the deflector where it contacts with the shell may be secured thereto as by means of solder or electric welding or other known or preferred means and the device as shown may be varied in other respects within the scope of the appended claims.

By the use of my deflector the necessity for a dimmer is done away with. The light is thrown back by the reflecting rear surface of the depending apron and is thrown down to the road by the reflecting under surface of the shelf 14. In this way the light falls on the ground and illuminates the road thoroughly but the glare, which is a common cause of accidents, is eliminated, as I find that a person can stand at a reasonable distance in front of a car equipped with my device and look right into the lights without being blinded at all. This is due to the fact that the direct rays from the lamp are thrown down on the ground instead of being reflected into the eyes of an approaching person. I have shown the front apron as coming down slanting in front of the headlight in the shape of a half-moon and this is the preferred and most effective form of my invention, but this and other details may be varied within the scope of my invention.

Having thus fully described my said invention, what I claim as new and desire to secure by Letters Patent, is:

1. In a headlight a parabolic reflector, a lamp supported by the reflector in the focal center thereof, an opaque partition arranged in the reflector above the lamp, said partition being of a shape to conform to the contour of the reflector and having a depending portion extending across its front, the ends of said depending portion being extended around the sides of the reflector to provide supports, said partition also being provided at its rear with a portion extending through the reflector for securing the same thereto, the underside of said partition and the inner side of the depending portion thereof being polished to reflect the rays of light in a horizontal plane and downwardly upon the roadbed, substantially as set forth.

2. As an article of manufacture, a deflector for a headlight comprising a body having a substantially horizontally disposed ledge shaped to conform to the contour of a reflector and having a forward depending portion curving upwardly toward its ends with integral tongues extending from said ends adapted to engage the side edges of a reflector for securing the same thereto said substantially horizontally disposed ledge having an integral tongue at the rear edge thereof adapted to extend through a reflector for securing said portion thereto said deflector having the underside and rear side of said depending portion provided with a light reflecting surface, substantially as set forth.

In witness whereof, I have hereunto set my hand at Fostoria, Ohio this 31st day of August, A. D. nineteen hundred and twenty-two.

JOSEPH DROLL.